(12) United States Patent
Colquitt (10) Patent No.: US 10,210,583 B2
(45) Date of Patent: Feb. 19, 2019

(54) INTEGRATED AUTOMATED BILL AND BUDGET RECONCILIATION, CASH FLOW ALLOCATION AND PAYMENT SOFTWARE SYSTEM

(71) Applicant: Elena A. Colquitt, Atlanta, GA (US)

(72) Inventor: Elena A. Colquitt, Atlanta, GA (US)

(*) Notice: Subject to any disclaimer, the term of this patent is extended or adjusted under 35 U.S.C. 154(b) by 225 days.

(21) Appl. No.: 14/996,291

(22) Filed: Jan. 15, 2016

(65) Prior Publication Data
US 2016/0210701 A1    Jul. 21, 2016

Related U.S. Application Data

(60) Provisional application No. 62/105,192, filed on Jan. 19, 2015.

(51) Int. Cl.
*G07B 17/00* (2006.01)
*G06Q 40/00* (2012.01)
*G06Q 10/06* (2012.01)

(52) U.S. Cl.
CPC ............ *G06Q 40/12* (2013.12); *G06Q 10/06* (2013.01)

(58) Field of Classification Search
CPC ............................. G06Q 40/12; G06Q 30/06
USPC .......................................................... 705/30
See application file for complete search history.

(56) References Cited

U.S. PATENT DOCUMENTS

| | | | |
|---|---|---|---|
| 5,684,695 A * | 11/1997 | Bauer | G01S 13/89 701/23 |
| 5,978,780 A * | 11/1999 | Watson | G06Q 20/10 705/38 |
| 6,732,919 B2 * | 5/2004 | Macklin | G06Q 20/342 235/375 |
| 8,484,104 B1 | 7/2013 | Hurlbutt et al. | |
| 8,527,382 B2 | 9/2013 | McDonough et al. | |
| 8,606,708 B1 | 12/2013 | Homier et al. | |
| 8,639,622 B1 | 1/2014 | Moore et al. | |
| 8,788,416 B1 | 7/2014 | Vu | |
| 2010/0094740 A1 | 4/2010 | Richter | |
| 2010/0100470 A1 | 4/2010 | Buchanan et al. | |
| 2012/0173330 A1 * | 7/2012 | Rodin | G06O 30/0251 705/14.49 |
| 2014/0358775 A1 * | 12/2014 | Furbish | G06Q 20/14 705/40 |

OTHER PUBLICATIONS

Popper, Nathaniel, "Automated Assistants Will Soon Make a Bid for Your Finances," DealBook, The New York Times, Dec. 7, 2016 (available at: http://www.nytimes.com/2016/12/07/business/dealbook/automated-assistants-will-soon-make-a-bid-for-your-finances.html?emc=eta1) (5 pages).
"Accounting Software Update: Managing Your Money—Fun, easy, Profitable!", Accounting Technology, (1994) (3 pages).
Yusof, et al., "Personal Financial Planner: A Mobile Application that Implementing Forward Chaining Technique for Notification Mechanism", 2014 IEEE Symposium on Computer Applications & Industrial Electronics (ISCAIE), Apr. 7-8, 2014, Penang, Malaysia (5 pages).

* cited by examiner

*Primary Examiner* — Rokib Masud
(74) *Attorney, Agent, or Firm* — Ballard Spahr LLP (57) ABSTRACT

An apparatus and method for an integrated automated bill and budget reconciliation, cash flow allocation, and payment software system are disclosed.

20 Claims, 5 Drawing Sheets

INTEGRATED AUTOMATED BILL AND BUDGET RECONCILIATION, CASH FLOW ALLOCATION AND PAYMENT SOFTWARE SYSTEM

CROSS-REFERENCE TO RELATED APPLICATIONS

This application claims the benefit of U.S. Application 62/105,192 filed Jan. 19, 2015, the entire disclosure of which is incorporated herein by reference.

FIELD

The invention generally relates to banking automation. More specifically, the invention relates to apparatus and methods for managing a budget and facilitating cash flow allocation in order to achieve a prioritized set of financial goals.

BACKGROUND

Individuals and small business owners often rely on computer-based systems to create a budget, make timely bill payments, maximize investments, and effect various other financial transactions. Using a budget allows individuals and small business owners to set and achieve financial goals. Such financial goals include, for example, retirement, saving for a home purchase, paying for college, and growing a small business.

Existing computer-based systems attempt to accommodate an individual's or a small business owner's customized financial goals by providing automated bill payment, budgeting software, and spending alerts. These existing computer-based systems allow a user to amend the budget when financial conditions change, such as an increase or decrease in income, the birth of a new child, a new client, and many others. If a change in financial conditions occurs, and if it is desirable that financial goals of a higher priority are achieved before those of a lower priority, existing systems require the user to amend the budget manually.

What is a lacking in the existing computer-based systems is the automatic adjustment of an individual's or a small business owner's budget and cash flows, based on prioritized financial goals, when financial conditions change. An automatic adjustment, without requiring any action from the individual or small business owner, would greatly increase the likelihood that financial goals of a higher priority are met more quickly or at all. Accordingly, it would be desirable to provide individuals and small business owners with a computer-based system for budget automation and financial management that would adjust cash flows on-the-fly, in accordance with a preset prioritized set of financial goals, when financial conditions change. The subject invention is directed to these, as well as other, needs.

SUMMARY

It is to be understood that both the following general description and the following detailed description are exemplary and explanatory only and are not restrictive, as claimed. Accordingly, in a first aspect, the invention is directed to an apparatus comprising a memory having encoded thereon computer-executable instructions and a processor functionally coupled to the memory and configured, by the computer-executable instructions, to manage a budget for a user, the budget comprising monetary inputs and monetary outputs and data from accounts associated with the monetary inputs and monetary outputs; to organize the monetary outputs into a prioritization schedule; and to apportion the monetary inputs, without action from the user, among the monetary outputs based on the prioritization schedule.

In another aspect, the invention is directed to methods of managing a user's budget. The method comprises preparing and storing the budget, which includes the user's monetary inputs and monetary outputs organized into a prioritization schedule. The method further comprises storing data from accounts associated with the monetary inputs and monetary outputs. Finally, the method comprises automatically apportioning, based on the prioritization schedule, the user's monetary inputs among the user's monetary outputs and configuring the monetary output transactions.

Additional advantages will be set forth in part in the description that follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Before the present apparatus and methods are disclosed and described, it is to be understood that the apparatus and methods are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present apparatus and methods may be understood more readily by reference to the following detailed description of preferred embodiments and the examples included therein and to the Figures and their previous and following description.

As will be appreciated by one skilled in the art, the apparatus and methods may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present apparatus and methods may take the form of web-implemented computer software. Any suitable computer-readable storage medium may be utilized including hard disks, CD-ROMs, optical storage devices, or magnetic storage devices.

Embodiments of the apparatus and methods are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, the apparatus and methods described herein are directed to the management of a user's budget. The user 100 may be, for example, an individual or a small business owner. In an aspect, the apparatus and methods comprise a processor and a memory, which is a computer-readable medium, capable of storing computer-executable instructions, which, when executed by the processor, causes the processor to perform at least the steps or processes described in this disclosure. In at least one embodiment, the apparatus and methods function as a computer-accessible system with a graphical user interface ("GUI") presented on a display. The GUI is the point of access between the user 100 and the system, and the GUI preferably displays information pertaining to the budget, accounts, monetary inputs and outputs, and other values described below, both in graphical and textual formats.

The user 100 preferably registers with the system. In at least one embodiment, registration comprises the user 100 submitting any or all of the following: first name, middle name, last name, physical address, e-mail address, date of birth, gender, occupation, education level, interests, phone numbers, and usernames and passwords for financial account websites associated with the user 100. The system preferably validates any or all of this information.

Figure 1:
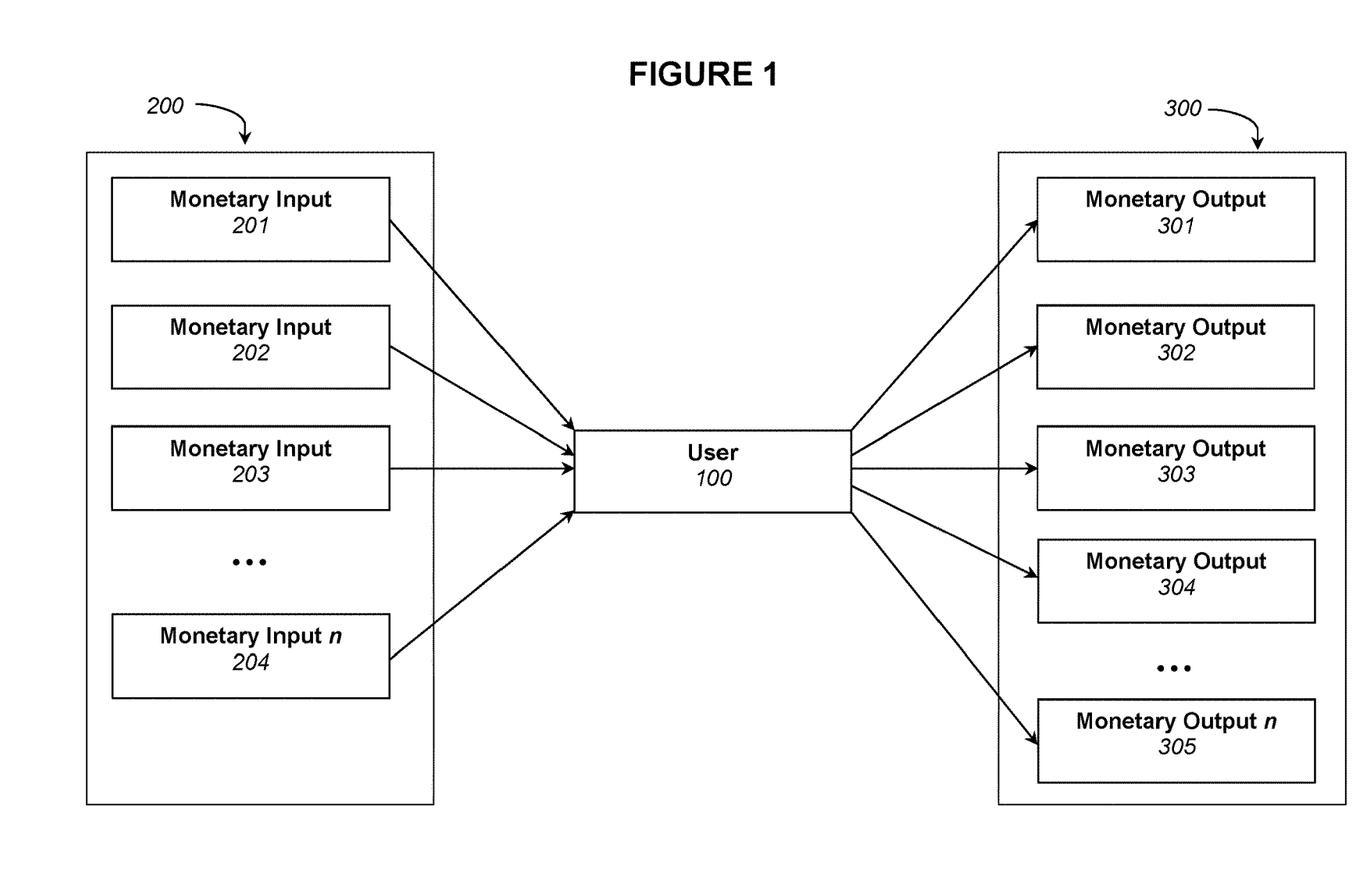
FIG. 1 is a block diagram of an apparatus for managing a user's budget according to an exemplary embodiment of the invention.

In at least one exemplary embodiment, as depicted in FIG. 1, the user 100 also provides financial information during registration pertaining to monetary inputs 200 and monetary outputs 300. Monetary inputs 200 may include, for example, employment paychecks 205, investment dividends 206, annuities 207, interest from savings accounts 208, accounts receivable, and others currency inflows. Monetary outputs 300 may include, for example, payments to creditors 312, 313, utility payments 307, accounts payable, grocery costs 308, automobile payments, transportation costs 309, housing costs 306, investments, and other currency outflows. For each monetary input 200 or monetary output 300, the user 100 provides any or all of the following: name of financial institution, authorization information, type of account with the financial institution, description of the account, and account number or partial account number. For example, if the financial institution is a bank called BankOne, the authorization information is the user's 100 username and password to access BankOne's website; the type of account is a checking account; the description of the account is "User's BankOne: All Expenses Paid from Here"; and the account number or partial account number is the checking account number associated with the user's 100 checking account. Many values for these inputs are possible. For example, the type of account may be for savings, a credit card, a loan, retirement, investment, and so on, and the user 100 preferably inputs information for a plurality of accounts. Based on the values the user 100 inputs, the system may request additional information. For example, if the type of account is a 401(k) account, the system may prompt the user 100 to enter the user's marginal tax rate and the user's employer match value in order to calculate a true investment return rate.

Once the user 100 enters the information for all accounts associated with the user's monetary inputs 200 and outputs 300, including the authorization information, the information need not be entered again. Rather, the system stores the information securely, and the user 100 logs into the system using the username and password selected during registration for access to information for all of the user's accounts, budget, financial goals, and other information.

Figure 2:
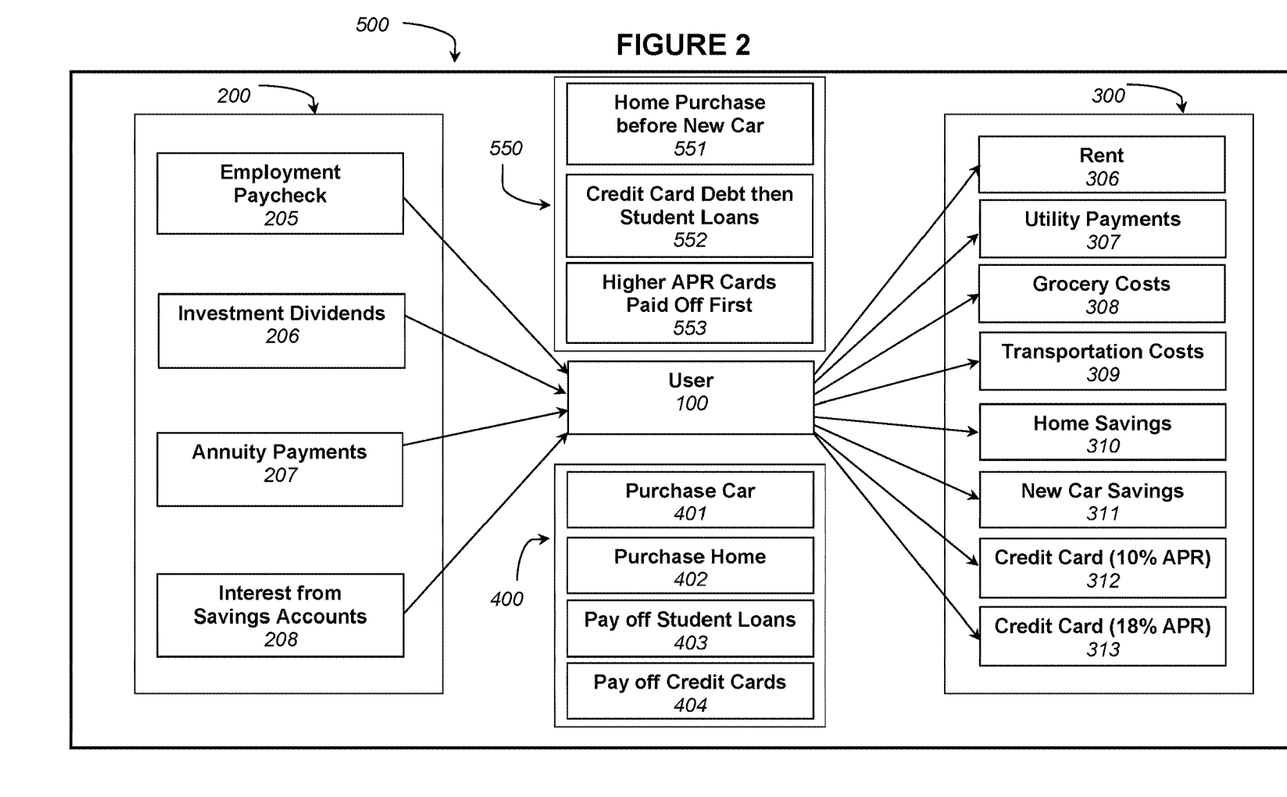
FIG. 2 is a block diagram of an apparatus for prioritizing a user's budget according to an exemplary embodiment of the invention.
Figure 4:
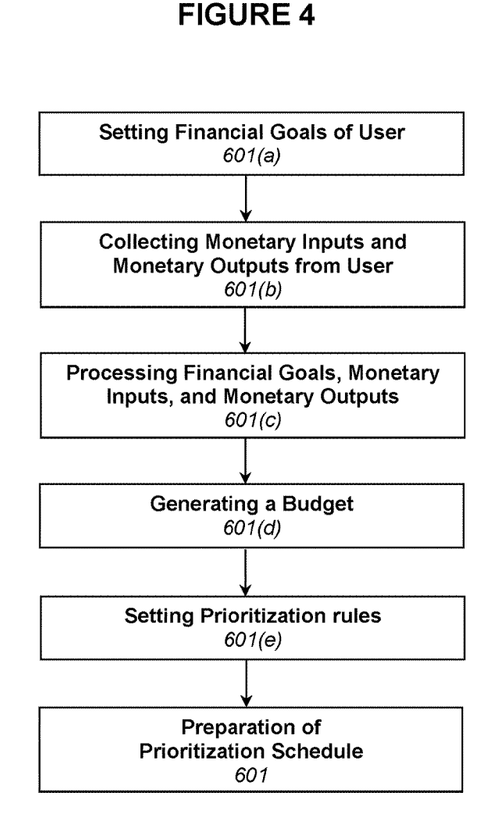
FIG. 4 illustrates a method for prioritizing a user's budget according to an exemplary embodiment of the invention.

In an aspect, as depicted in FIG. 2, the system manages a budget for the user 100, the budget comprising the monetary inputs 200 and monetary outputs 300 provided by the user 100. Additionally, the system organizes the monetary inputs 200 and outputs 300 from the budget into a prioritization schedule 500, as depicted in FIGS. 2 and 4, which the system uses to apportion the monetary inputs among the various monetary outputs 602. In an aspect, as depicted in FIG. 4, the system prepares the prioritization schedule 601 by performing the following steps: collecting information from the user to set financial goals 601(a), collecting monetary inputs and outputs from the user 601(b), processing the monetary inputs and outputs 601(c), generating a budget 601(d), and setting the prioritization rules 601(e). In a further aspect, as depicted in FIG. 2, the system organizes the prioritization schedule 500 using an apparatus. The apparatus organizes the prioritization schedule 500 in accordance with financial goals 400 provided by the user 100. For example, if the user 100 desires to purchase a home 402 in the near future and to purchase a car 401 after the home is purchased, the prioritization schedule 500 will include prioritization rules 550 to reflect the home purchase 551 being a higher-priority financial goal than the car purchase. Accordingly, the system would apportion a larger share of the monetary inputs 200 into a financial instrument, account, or security intended for saving for a home purchase 310. By way of illustration, this could include scheduling a transfer of a portion of the monetary inputs 200 into a savings account with a high interest rate yield, a certificate of deposit, treasury bonds, or various other financial instruments. Preferably, the system would use a separate financial instrument, account, or security intended for savings for each savings-based financial goal provided by the user 100. In another example, if the user 100 indicates a desire to pay off credit card debt 404 before paying off a student loan 403, the system would apportion a larger share of the monetary inputs 200 to accounts held by the user 100 associated with credit cards 552 and a smaller share of the monetary inputs 200 would be apportioned to accounts held by the user 100 associated with student loans. Preferably, if several credit card accounts exist, the system would apportion the share of the monetary inputs for paying down credit card debt in a manner to first pay off the credit card account accumulating the largest amount of interest before other credit cards 553.

Figure 3:
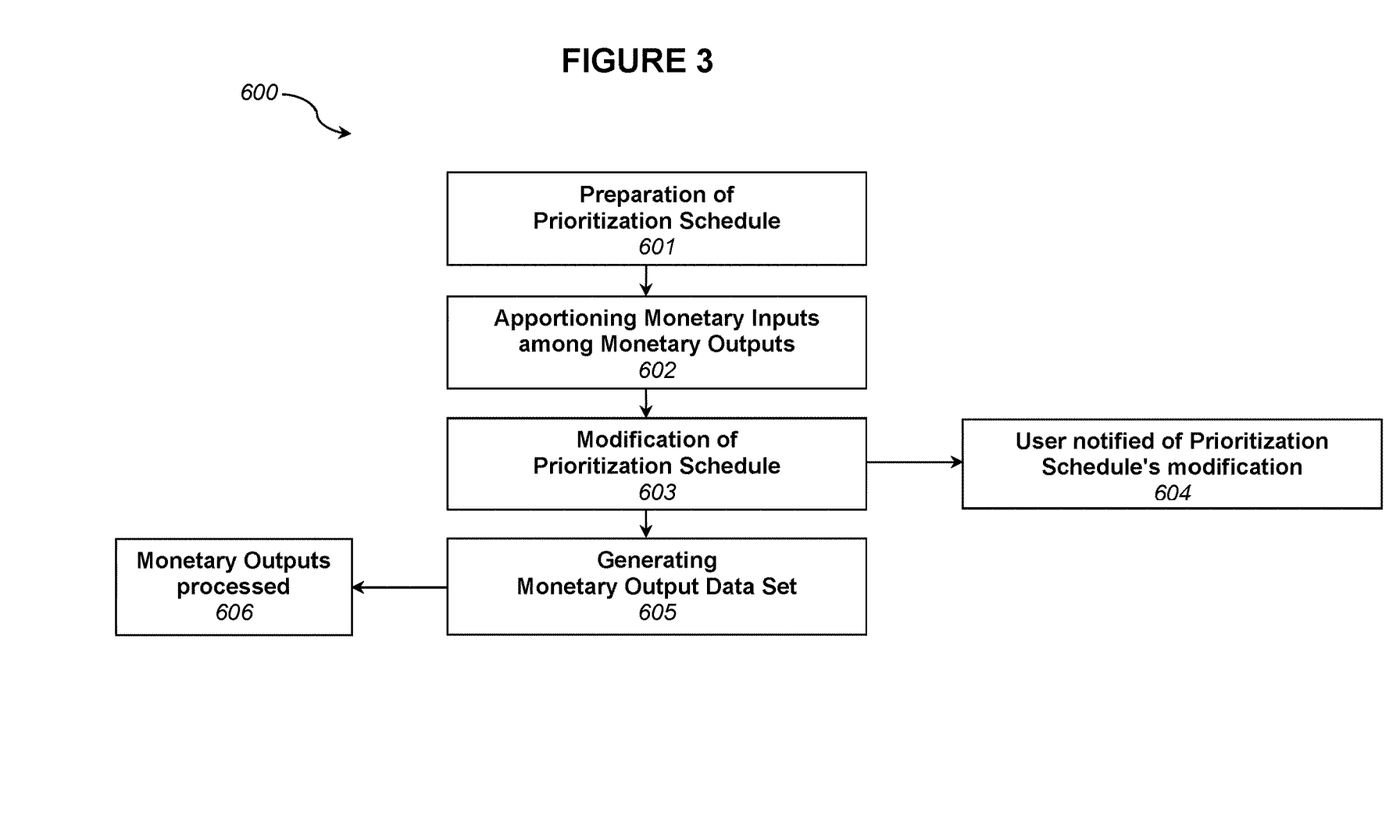
FIG. 3 illustrates a method for managing a user's budget according to an exemplary embodiment of the invention.

In an aspect, as depicted in FIG. 3, after the system apportions the monetary inputs among the monetary outputs 602, the system then generates a monetary output data set 605 comprising a transaction date, a transfer or payment amount, and the transfer or payment account information for each of the accounts associated with the monetary outputs 300. The system then provides the monetary output data set 605 to a third-party payment processor. The system may provide the monetary output data set 605 via the Internet, encrypted e-mail, or other secure means. Once received by the third-party payment processor, the payments or transfers detailed in the monetary output data set 605 are scheduled and executed by the third-party payment processor 606.

Optionally, the system may schedule or execute the payments or transfers within the monetary output data set 605 by accessing the host system of each account via the Internet. Using a series of macros and the credentials provided by the user 100, the system could, for example, access the website of each account's host system and schedule a payment or transfer for a date certain between the user's 100 primary checking account and the payment or transfer account. It is to be understood that the system may schedule or execute the payments or transfers to each of the user's monetary output 300 accounts by other methods not expressly provided herein.

In another aspect, the system, without action from the user 100, accesses the accounts provided by the user 100, either during registration or after registration, to update the information held in the system's memory for each account. Such information held in the system's memory for each account may include, for example, the account balance, interest rate, payment due date, investment portfolio, or various other account data pertinent to managing the user's 100 budget. The system may access the accounts daily, weekly, bi-weekly, or at another interval preferred by the user. The system may, for example, access an account via the Internet and use a series of macros to enter the account credentials on the account's website. The system may then use a series of macros to access portions of the website containing information pertinent to the budget, take a screen shot of each accessed page, and store the screen shots in the memory. The screen shots may be analyzed by the system using screen scraping, a technology well-known in the art, to extract relevant account information from the screen shots. The information extracted may then be used by the system to update pertinent information for the respective account.

Once the accounts are updated, the system may then update the budget and modify the prioritization schedule 603. For example, if an account associated with one of the user's 100 monetary inputs 200 is a deposit account used for payroll direct deposit by the user's 100 employer, the system may modify the budget and prioritization schedule 603 when an increase in the payroll direct deposit amount is detected. Such an increase could be the result of new employment, a promotion, or a raise. Accordingly, the budget would now have a higher net monetary inflow, and the prioritization schedule could then be modified by the system 603 to permit, for example, quicker attainment of a financial goal 400 of higher priority. Such a financial goal 400 could include, for example, a home purchase 402, set by the user 100 at a higher priority than other savings-related goals 551. The system could modify the prioritization schedule 500 by apportioning a larger share of the monetary inputs 200 to the financial savings instrument associated with the home purchase 310. Optionally, the system could apportion a larger share of the monetary inputs 200 among all of the monetary outputs 300 pro rata. It is to be understood that the system may modify the prioritization schedule 500 in a manner not expressly given as an example herein. Preferably, the system modifies the prioritization schedule 500 without requiring action from the user 100, and, once a modification is performed, the system notifies the user of the modification 604 by SMS, e-mail, pop-up window displayed on the GUI, or other means. The notification 604 may be a textual or graphical representation of the changes made to the budget, which could include, for example, information relating to the originally apportioned share of the monetary inputs 200 for a given monetary output 300 account along with the modified apportionment.

In another aspect, as depicted in FIG. 3, at any time the prioritization schedule 500 is modified, either by the user 100 or the system, a new monetary output data set 605 is generated by the system. Once the new monetary output data set 605 is generated, the system may then provide it to a third-party host system 606, as described above, it may access the accounts associated with each monetary output 300 and schedule a transfer or payment, as described above, or the system may take other action in order to effect a transfer or payment for each account included within the monetary output data set 605.

Figure 5:
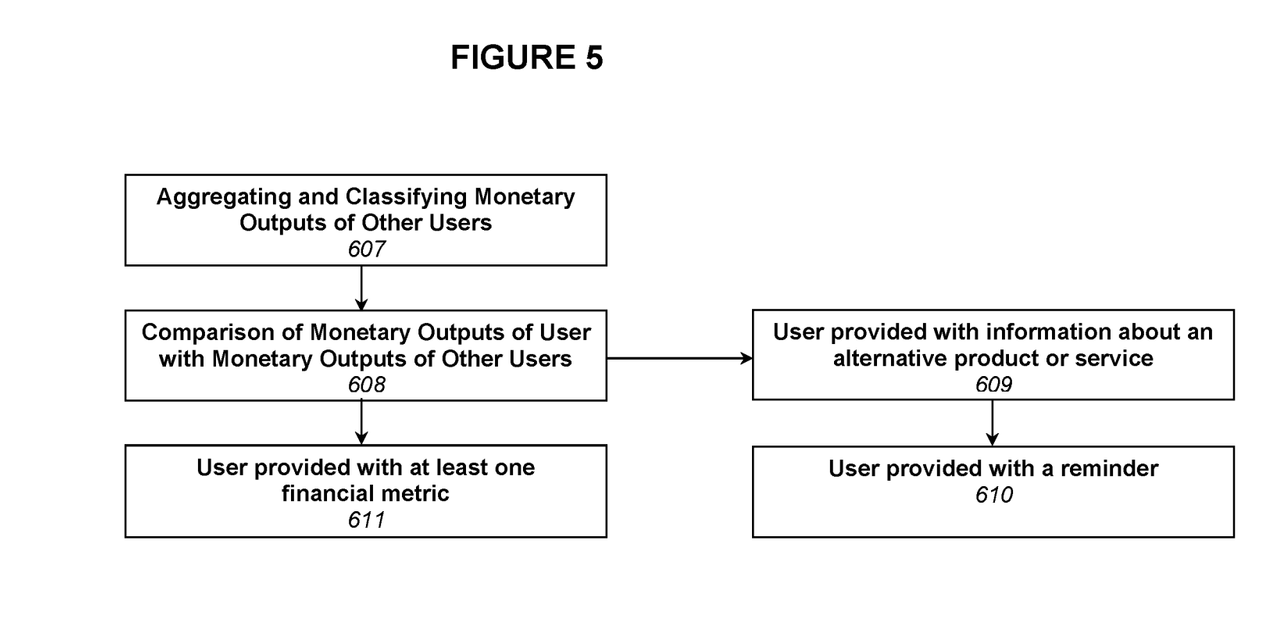
FIG. 5 illustrates a method for providing financial information to a user according to an exemplary embodiment of the invention.

In a further aspect, as depicted in FIG. 5, the system aggregates the monetary outputs of the user and the monetary outputs of other users of the system into an aggregated data set. Each of the monetary outputs 300 of the user 100 may be given a unique identifier to differentiate the individual outputs of the user from the aggregated outputs of the other users. The system then classifies each output in the aggregated data set based on a predetermined set of classes retained in the system's memory 607. The classifications may be provided by the financial institutions associated with each monetary output 300. For example, a credit card or debit card provider may classify the user's 100 transactions and make the classified transactions available via the user's 100 account on the provider's website or host system. From the classifications, the system may identify, for example, a particular transaction with a grocery store purchase. The system could then associate the transaction with a category called "food expenses." Other categories of monetary outputs could comprise mortgage, rent, utilities, transportation expenses, cell phone expenses, healthcare premiums, credit cards, loans, entertainment, retail shopping, and others.

Preferably, the system classifies the monetary outputs 300 without any action from the user 100; however, the user is 100 able to configure the classifications manually if desired. For example, the system may classify a restaurant purchase with the category "food expenses." The user 100 may not wish restaurant purchases to be categorized as a food expense, because the user wants to reduce the amount of money spent at restaurants. Therefore, the user 100 could manually change the classification to "entertainment expenses," which may have a lower allocation on the user's budget than "food expenses." The system would then classify any future restaurant purchases as an entertainment expense.

In another aspect, as depicted in FIG. 5, once the monetary outputs within the aggregated data set are classified 607, the system then analyzes and compares the monetary outputs 300 of the user 100 with the aggregated monetary outputs of other users of the same or similar classification 606. The analysis and comparison performed by the system allows the system to provide the user 100 with recommendations on an alternative product or service 609 when at least one of the monetary outputs 300 of the user 100 differs from the average monetary outputs of other users in the same classification. The term "differs" may mean the monetary output 300 of the user is greater than the average monetary output of other users in the same classification. This could include, for example, a cell phone payment. If the user's monthly monetary output 300 to a cell phone carrier is greater than the average monetary output of other users, the system could provide an alert to the user 609, via SMS, e-mail, a pop-up on the GUI, or another method, of the average cost of other users, and it may, for example, provide the user 100 with a promotion from a carrier with a lower average cost. The term "differs" could also mean the monetary output 300 of the user 100 is less than the average monetary output of other users in the same classification. This could include, for example, the user's monetary output 300 to a retirement account. If the user's 100 monthly monetary output 300 to a retirement account is less than the average monthly monetary output of other users, the system could provide an alert to the user 609, via SMS, e-mail, a pop-up on the GUI, or another method, of the average monthly retirement contribution of other users. Further, the alert may be provided a second time to the user 610, via SMS, e-mail, a pop-up on the GUI, or another method, at a predetermined time set by the user 100 or the system, reminding the user 100 to take action based on the information provided in the alert 609.

In a further aspect, as depicted in FIG. 5, the system provides the user 100 with the following financial metric(s) 611 at a predetermined interval set by the user 100 or the system: credit report and credit score; financial data for tax return preparation; and spending history. The system can provide the user with the financial metric(s) 611 in a variety of methods, including SMS, e-mail, a pop-up on the GUI, or other forms of electronic communication. The credit report and credit score information may include, for example, a graphical representation of the user's credit report, the user's 100 credit score, and related literature. Alternatively, the credit report and credit score information may be provided in a textual format, including, for example, the user's credit report, the user's 100 credit score, and hypertext links to online related literature. The tax return preparation information may include, for example, a graphical or textual representation of the user's 100 summarized monetary inputs 200 and monetary outputs 300 by classification. The spending history may include, for example, a graphical comparison of actual spending amounts versus budgeted spending amounts for a variety of transaction categories over a specified period of time, such as one month, one year, or other periods. Alternatively, the spending history information may be provided in a textual format, including, for example, actual spending amounts, budgeted spending amounts, and an indicator showing whether the actual spending amounts are above or within the budgeted value. It is to be understood that the system may provide other types of information for each of the above categories that is not expressly described herein.

While the apparatus and methods of the invention have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An apparatus, comprising:
   one or more processors; and
   a memory comprising processor-executable instructions that when executed by the one or more processors cause the apparatus to:
      receive a first dataset from a user device, the first dataset comprising one or more monetary input identifiers, one or more monetary output identifiers, and one or more expense identifiers, wherein each monetary input identifier comprises one or more attributes and is associated with an income source of the user, wherein each monetary output identifier comprises one or more attributes and is associated with either a financial liability of the user or a savings instrument of the user, and wherein each expense identifier comprises one or more attributes and is associated with a category of purchases;
      receive, from the user device, input data indicative of a priority level for each of the monetary output identifiers;
      receive, from the user device, a second dataset comprising one or more sets of host system login credentials, wherein each set of host system login credentials is associated with a monetary output identifier, a monetary input identifier, or a financial institution associated with the user;
      retrieve from one or more host systems, using the second dataset, account data associated with each monetary output identifier and each monetary input identifier;
      retrieve from a financial institution host system, using the second dataset, first banking data comprising one or more deposits and one or more withdrawals, wherein each deposit and each withdrawal comprises one or more attributes;
      associate, based on the first dataset and the first banking data, each deposit with a monetary input identifier and each withdrawal with either a monetary output identifier or an expense identifier;
      generate a first schedule of payments based on the first dataset, the account data, the associated deposits, the associated withdrawals, and the input data, wherein each payment is associated with a monetary output identifier and comprises an amount;
      retrieve from the financial institution host system, using the second dataset, second banking data comprising an anomalous deposit, wherein the second banking data is retrieved after the first banking data, and wherein the anomalous deposit comprises a set of attributes that are associated with a deposit of the first banking data; and
      account for an impact of the anomalous deposit on the one or more monetary output identifiers by:
         generating, based on the first schedule of payments and the anomalous deposit, a second schedule of payments comprising one or more revised payments, wherein each revised payment is associated with a monetary output identifier and comprises a revised amount.

2. The apparatus of claim 1, wherein the attributes of the one or more monetary input identifiers comprise one or more of an amount, a deposit date, or a deposit source.

3. The apparatus of claim 2, wherein the attributes of the one or more monetary output identifiers comprise one or more of an amount, a transaction date, a merchant identifier, or a company identifier.

4. The apparatus of claim 3, wherein the attributes of the one or more expense identifiers comprise one or more of an amount, a transaction date, a merchant identifier, or a category name.

5. The apparatus of claim 1, wherein the first schedule of payments and the second schedule of payments are further based on the priority level for each of the monetary output identifiers.

6. The apparatus of claim 1, wherein the one or more host systems and the financial institution host system comprise one or more of a webserver, a database, or a data warehouse.

7. The apparatus of claim 1, wherein the processor-executable instructions that cause the apparatus to associate each deposit with a monetary input identifier and each withdrawal with either a monetary output identifier or an expense identifier further cause the apparatus to:
   match the one or more attributes of each deposit with each of the one or more attributes of each monetary input identifier;
   match the one or more attributes of at least one withdrawal with each of the one or more attributes of each monetary output identifier; and
   match the one or more attributes of at least one withdrawal with each of the one or more attributes of each expense identifier.

8. The apparatus of claim 7, wherein a subset of the one or more expense identifiers comprises one or more expense identifiers classified by the user as entertainment expenses, automotive expenses, food expenses, school expenses, business expenses, or medical expenses.

9. The apparatus of claim 6, wherein the processor-executable instructions that cause the apparatus to generate the first schedule of payments further cause the apparatus to:
   log in to each of the one or more host systems, using the second dataset; and
   cause a payment to be scheduled, wherein a source of the payment is associated with the financial institution host system.

10. The apparatus of claim 8, wherein the memory further comprises processor-executable instructions that when executed by the one or more processors further cause the apparatus to:
    receive additional input data from the user device indicative of a threshold amount of a summation of one or more amounts of the subset of expense identifiers during a given period of time.

11. The apparatus of claim 10, wherein the memory further comprises processor-executable instructions that when executed by the one or more processors further cause the apparatus to:
    transmit a notification to the user device when the summation of the one or more amounts of the subset of expense identifiers reaches the threshold amount, wherein the notification comprises one or more of text, audio, or a visual representation.

12. A method comprising:
receiving, from a user device, a first dataset comprising one or more monetary input identifiers, one or more monetary output identifiers, and one or more expense identifiers, wherein each monetary input identifier comprises one or more attributes and is associated with an income source of the user, wherein each monetary output identifier comprises one or more attributes and is associated with a financial liability of the user or a savings instrument of the user, and wherein each expense identifier comprises one or more attributes and is associated with a category of purchases;
receiving, from the user device, input data indicative of a priority level for each of the monetary output identifiers;
receiving, from the user device, a second dataset comprising one or more sets of host system login credentials, wherein each set of host system login credentials is associated with a monetary output identifier, a monetary input identifier, or a financial institution associated with the user;
retrieving, from one or more host systems, using the second dataset, account data associated with each monetary output identifier and each monetary input identifier;
retrieving, from a financial institution host system, using the second dataset, first banking data comprising one or more deposits and one or more withdrawals, wherein each deposit and each withdrawal comprises one or more attributes;
associating, based on the first dataset and the first banking data, each deposit with a monetary input identifier and each withdrawal with either a monetary output identifier or an expense identifier;
generating a first schedule of payments based on the first dataset, the account data, the associated deposits, the associated withdrawals, and the input data, wherein each payment is associated with a monetary output identifier and comprises an amount
retrieving, from the financial institution host system, using the second dataset, second banking data comprising an anomalous deposit, wherein the second banking data is retrieved after the first banking data, and wherein the anomalous deposit comprises a set of attributes that are associated with a deposit of the first banking data; and
account for an impact of the anomalous deposit on the one or more monetary output identifiers by:
generating, based on the first schedule of payments and the anomalous deposit, a second schedule of payments comprising one or more revised payments, wherein each revised payment is associated with a monetary output identifier and comprises a revised amount.

13. The method of claim 12, wherein the attributes of the one or more monetary input identifiers comprises one or more of an amount, a deposit date, or a deposit source.

14. The method of claim 13, wherein the attributes of the one or more monetary output identifiers comprises one or more of an amount, a transaction date, a merchant identifier, or a company identifier.

15. The method of claim 14, wherein the attributes of the one or more expense identifiers comprises one or more of an amount, a transaction date, a merchant identifier, or a category name.

16. The method of claim 12, wherein the one or more host systems and the financial institution host system comprise one or more of a webserver, a database, or a data warehouse.

17. The method of claim 15, wherein associating each deposit with a monetary input identifier and each withdrawal with either a monetary output identifier or an expense identifier comprises:
matching the one or more attributes of each deposit with each of the one or more attributes of each monetary input identifier;
matching the one or more attributes of at least one withdrawal with each of the one or more attributes of each monetary output identifier; and
matching the one or more attributes of at least one withdrawal with each of the one or more attributes of each expense identifier.

18. The method of claim 17, wherein a subset of expense identifiers comprises one or more expense identifiers classified by the user as entertainment expenses, automotive expenses, food expenses, school expenses, business expenses, or medical expenses.

19. The method of claim 18, further comprising:
receiving additional input data from the user device indicative of a threshold amount of a summation of one or more amounts of the subset of expense identifiers during a given period of time.

20. The method of claim 17, wherein the anomalous deposit comprises an amount that is greater than or less than an amount of the deposit of the first banking data associated with the anomalous deposit.

* * * * *